United States Patent [19]

Anderson

[11] 4,159,735
[45] Jul. 3, 1979

[54] PLATE-FIN HEAT EXCHANGER WITH CONTROLS THEREFOR

[75] Inventor: J. Hilbert Anderson, York, Pa.

[73] Assignee: Sea Solar Power, York, Pa.

[21] Appl. No.: 846,319

[22] Filed: Oct. 28, 1977

[51] Int. Cl.² .................. B60H 1/00; F25B 41/04; F04F 5/48
[52] U.S. Cl. ........................ 165/40; 62/218; 417/182.5
[58] Field of Search .............. 62/218; 165/40; 417/183, 182.5

[56] References Cited

U.S. PATENT DOCUMENTS

| | | | |
|---|---|---|---|
| 1,944,115 | 1/1934 | Small | 62/218 |
| 2,132,932 | 10/1938 | Boileau | 62/218 |
| 2,676,575 | 4/1954 | Rosenberger | 417/183 |
| 2,776,092 | 1/1957 | Collins, Jr. | 165/40 |
| 3,940,301 | 2/1976 | Straw | 165/166 |

Primary Examiner—William L. Freeh
Attorney, Agent, or Firm—Kemon & Estabrook

[57] ABSTRACT

A heat exchanger fabricated from a plurality of plates arranged in spaced parallel relation with one another and assembled as a stack between pressure plates. The assembled stack of plates have top, bottom, and side cover members with one of the side covers having a liquid inlet and a vapor outlet. The liquid inlet is provided with a float control nozzle mechanism, that under certain conditions, will restrict or limit the flow of liquid to the plate members.

9 Claims, 3 Drawing Figures

PLATE-FIN HEAT EXCHANGER WITH CONTROLS THEREFOR

BACKGROUND OF THE INVENTION

The present invention is directed to heat exchangers of the type utilizing a liquid to effect a transfer of heat to another liquid and the vaporization of the second liquid.

When a heat exchanger is employed as an evaporator or boiler, as distinguished from a condenser, it is important to keep all surfaces wetted so that a maximum heat transfer effect occurs between the wetted surfaces and the liquid in order to create bubbles or boiling by the vapor action. As is well known in the field of refrigeration, when an evaporator is covered or filled with a liquid which is boiled by having heat applied to it through the heat exchanger surfaces, then the liquid itself has much higher density, usually, than the vapor which is created by boiling. If a vessel or chamber is filled with this liquid, obviously the weight of the liquid creates a higher pressure at the bottom of the chamber than at the top. This affects the saturation pressure or saturation temperature of the liquid. It is known that where pressure is higher a liquid must be raised to a higher temperature to make it boil. Thus, in a vessel or chamber containing liquid if you try to boil same the temperature must be raised to a higher level at the bottom of the column of liquid within said vessel or chamber than at the top of said column of liquid. This creates a heat transfer penalty, since the temperature difference between the water used to boil the fluid and the fluid at boiling temperature, is different at the bottom and the top. In common parlance this is called the "static head penalty" in an evaporator structure. In order to reduce this static head penalty it is advisable to keep the liquid level flooding the evaporator as low as possible so that there is as little difference between the top and the bottom of the column of liquid as possible. This then would reduce the static head penalty and improve the available temperature difference for creating boiling.

SUMMARY OF THE INVENTION

The present invention is directed to a heat exchanger of the multiple plate and fin type used for evaporating a refrigerant.

In order to reduce the static height of the liquid and thus overcome some of the difficulties or problems as mentioned herein above, the present invention utilizes a heat exchanger in the form of an evaporator having water passages flowing in planes perpendicular to the passageways for the liquid refrigerant. In order to reduce the static head penalty, the heat exchanger assembly is divided into a plurality of compartments or boiling chambers with the various chambers or compartments being disposed or arranged in super imposed relation to one another. While there is no apparent limit or restriction to the number of chamber compartments that could be employed, the present application discloses for purposes of illustration, a heat exchanger having three chambers or compartments.

DESCRIPTION OF THE PREFERRED EMBODIMENT

Figure 1:
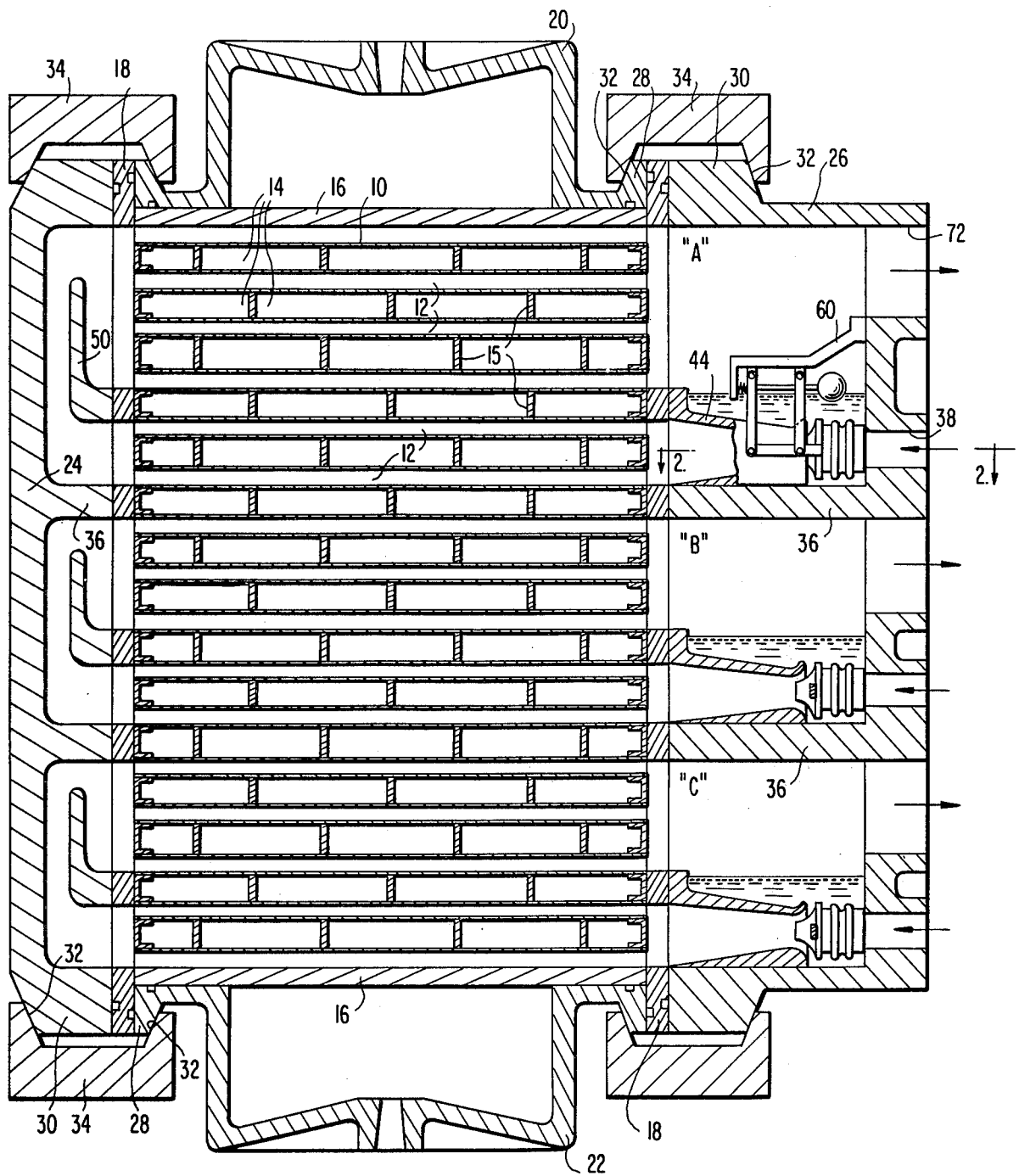
FIG. 1 is a vertical sectional view of a plate type heat exchanger embodying the present invention.

As shown in FIG. 1 the heat exchanger is an evaporator and consists of a plurality of plate members 10 that are assembled in a stack. The plate members 10 are arranged in pairs so as to define between adjacent pairs passageways 12 while water passages 14 are provided between the plates of each pair by means of separator strips or plates 15 arranged between the plates 10 of each pair. The plate members 10 are assembled in a stack form between pressure plates 16 with the edges of the plate members 10 engaging grooves or slots, not shown, provided in the gasket flanges 18 for effectively sealing the edges of said plate members to said gaskets.

The pressure plates 16 have associated therewith end cover members 20 and 22 while the gasket flanges 18 and the ends of the plate members 10 are provided with side cover members 24 and 26. The cover members 20, 22, 24 and 26 are formed with enlarged rim portions 28 and 30, each of which is provided with an inclined surface 32 that is engaged by a complimentary surface formed on a clamping plate 34. The clamping plates 34 are provided with fastening bolts, not shown, that are threaded into apertures provided in the enlarged rim portions 30, not shown, so that upon the tightening of said bolts the rim portions are drawn toward one another and compress the gasket flange 18 for effectively sealing the plate members 10 and also the system in the retention of said plates in proper position with the heat exchanger.

The passageways 12 may readily be provided with separator plates or the like such as shown in Applicant's co-pending application Ser. No. 846,318 filed Oct. 27, 1977 which will tend to increase the effectiveness of the heat transfer plate member 10 when a liquid refrigerant is flowing through said passageway.

It is desirable to have a rather uniform pressure applied over the entire area of the pressure plates 16 so that all of the separator plates in the pasageways 12 as well as the separator strips or plates 15 are uniformly pressed against the heat transfer plates 10. Such an arrangement provides for good heat transfer contact so that the separator plates tend to act as extended heat transfer surfaces. Inasmuch as the clamping plates 34 are secured only at the edges, they would tend to compress the transfer plates at the edges and thus would apply very little pressure at the middle of said plates. Thus in order to insure rather uniform pressure of the stack of transfer plate members 10, the cover members 20 and 22 each have a cavity formed therein which could have a pressure bag inserted therein or could have a liquid in said cavity under pressure. This type of arrangement would be the same as shown in Applicant's co-pending application Ser. No. 846,318 filed Oct. 27, 1977, and the pressure developed in said cavities would be applied to the pressure plates 16 which in turn would apply pressure to the pressure plate members 10 and the separators in the passageways 12.

The cover members 24 and 26 have been provided with a plurality of partitions 36 which define said heat exchanger into three separate boiling compartments or chambers designated "A" and "B" and "C." It is obvious that the heat exchanger could be divided into more or fewer compartments or chambers so that the three compartments or chambers as shown in FIG. 1 are purely for illustration purposes. It is to be further noted that the compartment or chamber "A" is provided with two inlet passageways 12 and four outlet passageways 12, while the compartments "B" and "C" are provided with three outlet passageways 12. Hereagain this arrangement is for purposes of illustration as it is obvious that the size of the various compartments or chambers and the passageways therein could be varied.

Inasmuch as the delivery of a liquid refrigerant to one of the chambers or compartments is identical with the delivery to the other compartments, the present description will be directed to compartment "A" and the mechanism associated therewith. It is understood, however, that the same type of mechanism would be employed with respect to the compartments or chambers "B" and "C". The cover member 26 is formed with an inlet opening 38 that has associated therewith a nozzle core member 40, FIG. 2, which is carried in the center of a spider member 42 which is mounted on the inner side of the cover 26. The nozzle core member 40 has associated therewith a diffuser or float member 44 that is supported at its inner end by the gasket flanges 18 and certain of the plate members 10. The diffuser or float member 44 is formed with a flared opening or mouth 46 which merges with a restricted area 48 that diverges into an enlarged discharge opening for delivering a liquid to the two lower passageways 12 in the chamber or compartment "A." The liquid flows through the passageways 12 into the compartment in the cover 24 where said liquid flows up through the compartment in the cover 24 and over a baffle plate 50 from whence it passes into the upper passageways 12.

The nozzle core member 40 is provided with a movable converging nozzle 52. The nozzle 52 is provided with an annular bead or rim 54 which has mounted thereon one end of a bellows or diaphragm member 56 with the other end of the bellows being secured to the spider member 42. The nozzle 52 has secured thereto a pair of spaced yoke or support members 58 that are arranged in spaced parallel relation with one another. The cover member 26 has secured thereto a web or plate member 60 that projects into the compartment or chamber "A" and has pivotally connected to the lower face thereof a plurality of swinging link members 62. The lower ends of the link members 62 are pivotally connected to the yoke or support members 58 that carry the nozzle member 52. The plate member 60 is formed at its inner end with a depending segment 64 which has a coil compression spring 66 interposed therebetween and one of the link members 62. A conventional float ball 68 is mounted on the end of an arm 70 that in turn passes through the links 62 and is anchored to the link 62 that is engaged by the coil spring 66. Thus, as the liquid collects in the lower portion of the chamber or compartment "A" the float ball 68 will move up or down dependent upon the level of the liquid. This movement of the float ball 68 together with the force of the spring 66 will be transmitted through the links 62 to the yoke members 58 which in turn will cause the nozzle member 52 to move either away from or towards the flared opening or mouth 46 of the diffuser element 44. In turn the movement of the nozzle member 52 will also be either towards or away from the nozzle core member 40.

In the use of the heat exchanger of the present invention, the plate members 10 together with the pressure plates 16, are assembled in stack form within the cover members 20, 22, 24 and 26 where they are retained in said assembled position by the clamping plates securing said cover members together. In addition, the pressure applied to the pressure plates 16 through the introduction of a liquid or gas, under pressure, in the cavities formed in the cover members 20 and 22 will insure a uniform pressure being applied to the plate members and the separators in the passageways 12. The liquids flowing through the inlet opening 38 in the cover member 26 could be coming from a condenser at a considerably lower temperature than boiling temperature so that an immediate objective in directing the liquid through the lower passageways 12 in the compartment or chamber "A" is simply to heat the liquid flowing through said passageways to about a boiling temperature. After the liquid passes through the lower passageways, it flows up through the compartment in the cover 24 and over the baffle plate 50 and then falls down into said chamber or compartment at the inlet of the four passageways 12 shown in the upper portion of the chamber or compartment "A." The directing of the liquid over the baffle 50 and then allowing same to fall in the compartment in the cover 24, makes reasonably sure that liquid is admitted to all of the upper passageways 12 rather than just the lower or lower two passageways. Since it is highly desirable to have all of the surfaces of the plate members 10 wetted it is highly important that liquid be introduced to all of the inlets of the upper passageways as the heat transferred from the water flowing through the compartments within the plate members 10 will transfer heat to said liquid causing same to boil into a vapor. The liquid and vapor will flow through the upper passageways 12 into the compartment in the cover 26, and the vapor will be discharged from said compartment through the discharge orifice 72. The liquid flowing through the upper passageways 12 will collect in the lower portion of the compartment in the cover 26 and any liquid entrained in the vapor moving through said passageways will more than likely be deposited as droplets in the lower portion of the compartment in the cover 26 while the vapor will flow through the discharge opening 72.

The nozzle structure mounted in the lower portion of the compartment in the cover 26 acts as a jet pump and draws the liquid lying in said compartment in the cover into the stream of liquid being introduced into the heat exchanger so as to recirculate the liquid collected within the cover 26. This arrangement assures that there is always more liquid flowing through the heat exchanger than there is vapor and it helps to assure that all of the heat transfer surfaces of the heat exchanger are wetted all the time as it is extremely important to make the heat transfer surfaces or plate members 10 with the separator plates asociated therewith as effective as possible, and in order to do so, it is necessary to be sure that all the surfaces are wetted.

In order to assure an adequate quantity of recirculating liquid in each compartment or chamber of the heat exchanger, and thus not allow too much liquid in one compartment it is highly desirable to have individual controls on each inlet nozzle with an inlet nozzle being provided for each of the compartments or chambers in the manner as illustrated in FIG. 1. Thus, if the liquid in the compartment "A" becomes too high it raises the float ball 68 and this in turn causes the nozzle member 52 to move towards the nozzle core member 40 so that less flow enters the inlet opening 38 and this condition remains until enough of the liquid evaporates and flows as a vapor through the outlet orifice 72 thus permitting the float ball 68 to drop or seek a lower level whereby more liquid may then be introduced into the compartment. It is to be noted that in the present disclosure the nozzle member 52 is movable toward and away from the diffuser and the core member 40. The nozzle member 52 while carried by the members 58 is also attached to the bellows 56 which permits the nozzle to have a free back and forth movement which is virtually frictionless. This arrangement is important in a closed system where access to the various parts for repair or correction of any malfunction is extremely difficult. Thus, when the nozzle support links or members 58 through the action of the links 62 there is very little vertical motion, yet the nozzle is maintained in alignment with the diffuser 44 and core member 40 without any slides or bearings on which it might rub. Thus, the entire arrangement of the nozzle is readily adaptable to a closed system as the lack of any sliding parts moving with respect to one another tends to negative the possibility of friction developing or jamming due to dirt or the like accumulating on said parts.

Figure 2:
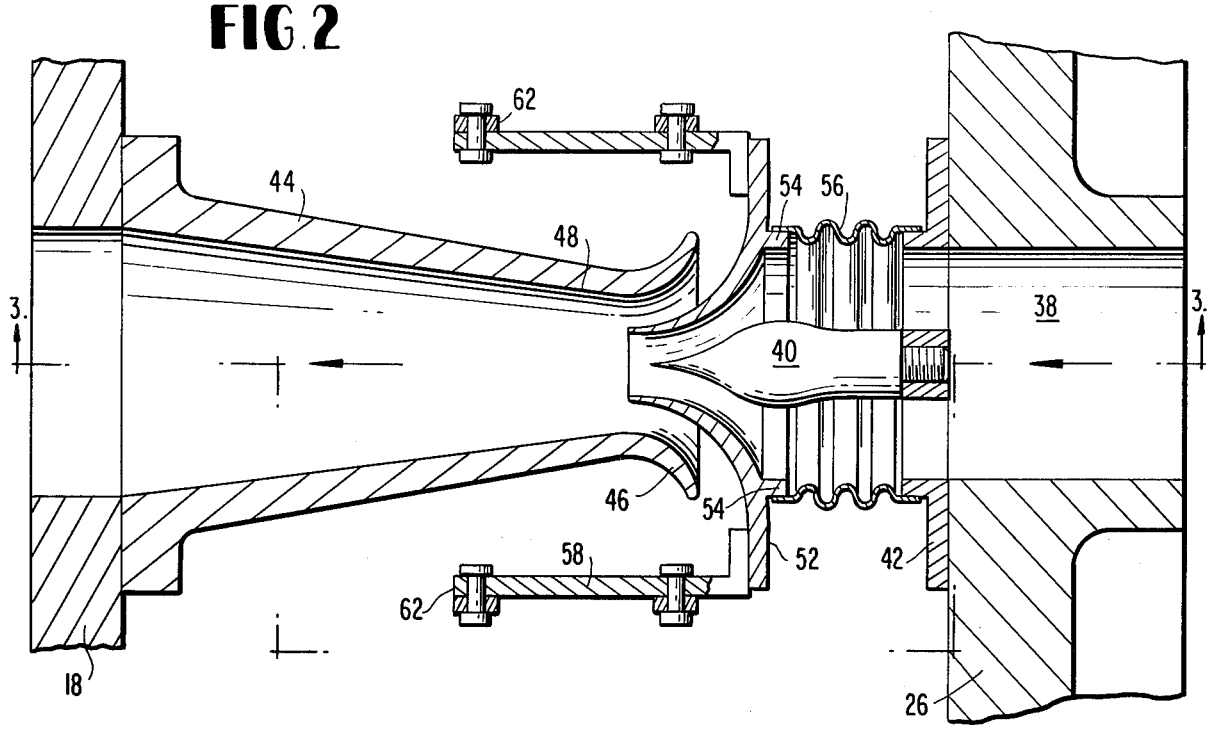
FIG. 2 is a vertical sectional view of the nozzle control for the heat exchanger, the view being taken on the line 2—2 of FIG. 1.
Figure 3:
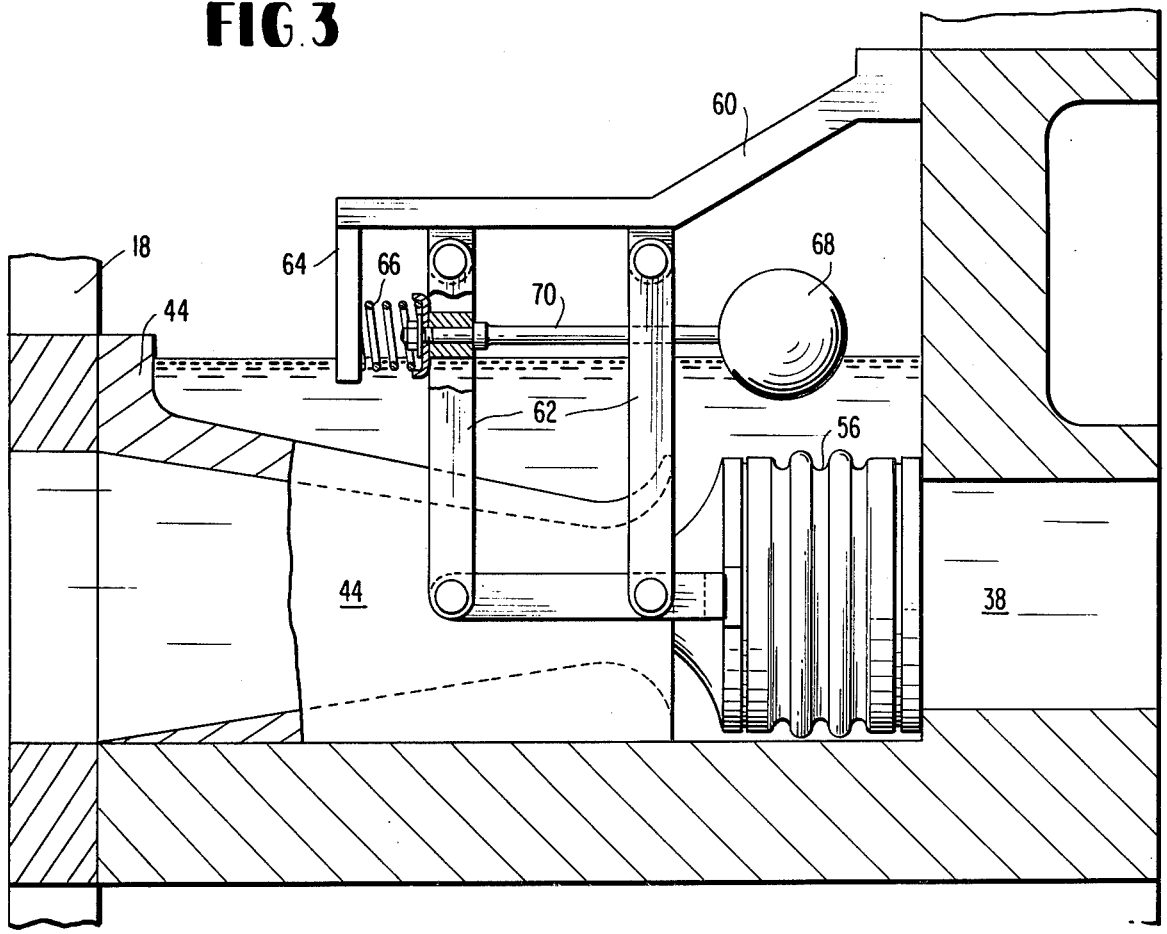
FIG. 3 is a sectional view of the nozzle control, the view being taken on the line 3—3 of FIG. 2.

The nozzle member 52 is subjected to a pressure from the liquid entering the inlet passage 38 so that there is a force trying to push the nozzle to the left, as viewed in FIG. 2, or to open said nozzle. To counteract this movement or action, the spring 66 interposed between the depending segment 64 and the support links 62 tends to produce a counteracting force thereby tending to close the nozzle with respect to the core member 40.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

I claim:

1. A control for a heat exchanger having a plurality of plates arranged in pairs in spaced parallel relation to one another with each pair of plates defining a passage therebetween and each pair of plates defining a passageway between adjacent pairs of plates, cover members for the top, bottom and sides of said plates, one of said cover members having a liquid inlet and a vapor outlet, a nozzle core member connected to said cover member in alignment with said inlet and certain of said passageways, a nozzle member suspended in said cover member in alignment with said nozzle core member, a diffuser arranged in alignment with said nozzle member with said nozzle member interposed between said core member and diffuser and means connected to said nozzle member for moving same towards and away from said core member and said diffuser to control the liquid flowing through said inlet and into said passageways.

2. A control for a heat exchanger as set forth in claim 1 wherein said one of said cover members is a side cover member having at least one partition therein dividing said cover member into a plurality of compartments with a diffuser being positioned in each compartment in alignment with said nozzle member.

3. A control for a heat exchanger as set forth in claim 2 wherein said diffuser is formed with a flared inlet that is engaged by said nozzle member to control the recirculation of fluid from said compartment to said passageways.

4. A control for a heat exchanger as set forth in claim 2 wherein each compartment is provided with an inlet and an outlet.

5. A control for a heat exchanger as set forth in claim 4 wherein said other side cover member is provided with at least one partition dividing said other side cover member into a plurality of compartments in alignment with said first-mentioned compartments, a baffle member positioned in each of said last mentioned compartments to divided said passageways into inlet and outlet passageways.

6. A control for a heat exchanger as set forth in claim 5 wherein said outlet passageways are greater in number than said inlet passageways with said diffuser communicating with said inlet passageways.

7. A control for a heat exchanger having a plurality of plates arranged in pairs in spaced parallel relation to one another with each pair of plates defining a passage therebetween and each pair of plates defining a passageway between adjacent pairs of plates, cover members for the top, bottom and sides of said plates, one of said cover members having a liquid inlet and a vapor outlet, a nozzle core member connected to said cover member in alignment with said inlet and certain of said passageways, a nozzle member suspended in said cover member in alignment with said nozzle core member, a plate member secured to said cover member, a plurality of links pivotally connected to said plate member, said link members connected to said nozzle member for moving same towards and away from said core member to control the liquid flowing through said inlet and into said passageways.

8. A control for a heat exchanger as set forth in claim 7 wherein a float member is connected to at least one of said link members, a spring interposed between said one link member and said plate for moving said nozzle member upon the movement of said float member.

9. A control for a heat exchanger having a plurality of plates arranged in pairs in spaced parallel relation to one another with each pair of plates defining a passage therebetween and each pair of plates defining a passageway between adjacent pairs of plates, cover members for the top, bottom and sides of said plates, one of said cover members having a liquid inlet and a vapor outlet, a nozzle core member connected to said cover member in alignment with said inlet and certain of said passageways, a nozzle member suspended in said cover member in alignment with said nozzle core member, said core member having one end of a bellows secured thereto with the other end of said bellows secured to said nozzle member and means connected to said nozzle member for moving same towards and away from said core member to control the liquid flowing through said inlet and into said passageways.

* * * * *